(12) United States Patent
Okazawa et al.

(10) Patent No.: US 11,008,906 B2
(45) Date of Patent: May 18, 2021

(54) OIL SUPPLY DEVICE FOR ENGINE MOUNTED IN VEHICLE

(71) Applicant: TOYOTA JIDOSHA KABUSHIKI KAISHA, Toyota (JP)

(72) Inventors: Shingo Okazawa, Toyota (JP); Michitaka Yamamoto, Okazaki (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 586 days.

(21) Appl. No.: 15/914,577

(22) Filed: Mar. 7, 2018

(65) Prior Publication Data

US 2018/0266287 A1 Sep. 20, 2018

(30) Foreign Application Priority Data

Mar. 16, 2017 (JP) .............................. JP2017-051181

(51) Int. Cl.
| | |
|---|---|
| *F01M 1/16* | (2006.01) |
| *F01M 1/02* | (2006.01) |
| *F16N 7/38* | (2006.01) |
| *F16N 13/20* | (2006.01) |
| *F16N 27/02* | (2006.01) |

(52) U.S. Cl.
CPC ............... *F01M 1/16* (2013.01); *F01M 1/02* (2013.01); *F16N 7/38* (2013.01); *F16N 13/20* (2013.01); *F16N 27/02* (2013.01); *F01M 2001/0238* (2013.01); *F01M 2001/0246* (2013.01); *F16N 2210/04* (2013.01); *F16N 2250/04* (2013.01); *F16N 2250/08* (2013.01); *F16N 2270/70* (2013.01); *F16N 2280/00* (2013.01)

(58) Field of Classification Search
CPC .... F01M 1/16; F01M 1/02; F01M 2001/0238; F16N 7/38; F16N 13/20; F16N 27/02; F04C 14/18
See application file for complete search history.

(56) References Cited

U.S. PATENT DOCUMENTS

| | | | |
|---|---|---|---|
| 9,410,514 B2 * | 8/2016 | Watanabe | .............. F02M 39/02 |
| 2005/0232785 A1 * | 10/2005 | Scholl | ................... F04C 2/3442 |
| | | | 417/220 |
| 2010/0031915 A1 | 2/2010 | Riedel et al. | |

(Continued)

FOREIGN PATENT DOCUMENTS

| | | |
|---|---|---|
| CN | 101643055 A | 2/2010 |
| JP | 2013-163973 A | 8/2013 |

(Continued)

*Primary Examiner* — Michael R Mansen
*Assistant Examiner* — Mark K Buse
(74) *Attorney, Agent, or Firm* — Oliff PLC

(57) ABSTRACT

An oil supply device includes an oil pump and an oil control valve. The oil control valve is connected to a control oil chamber of the oil pump via a control oil passage that includes an oil descent passage and an oil rise passage. One end of the oil descent passage on the control oil chamber side is disposed at a position closer to a bottom of the vehicle than the other end on the oil control valve side. The oil rise passage is disposed at a position closer to the control oil chamber side than the oil descent passage. One end of the oil rise passage on the control oil chamber side is disposed at a position closer to a top of the vehicle than the other end on the oil control valve side.

6 Claims, 7 Drawing Sheets

(56) References Cited

U.S. PATENT DOCUMENTS

| | | | | |
|---|---|---|---|---|
| 2012/0138011 A1* | 6/2012 | Maccarrone | ............ | F01C 21/10 123/196 R |
| 2015/0285246 A1* | 10/2015 | Tsuge | ................ | F04C 14/10 418/26 |
| 2015/0377098 A1* | 12/2015 | Murakami | ............. | F04C 2/102 417/228 |
| 2016/0177950 A1* | 6/2016 | Watanabe | ............. | F04C 2/3442 418/24 |
| 2016/0348673 A1* | 12/2016 | Honda | ................ | F04C 2/344 |
| 2017/0241416 A1* | 8/2017 | Yamamoto | ............ | F04C 14/223 |
| 2018/0023427 A1* | 1/2018 | Honda | ................ | F01M 11/10 123/196 CP |
| 2018/0223840 A1* | 8/2018 | Naganuma | ............ | F04C 2/3442 |

FOREIGN PATENT DOCUMENTS

| | | |
|---|---|---|
| JP | 2016-011594 A | 1/2016 |
| JP | 2016-102423 A | 6/2016 |

\* cited by examiner

OIL SUPPLY DEVICE FOR ENGINE MOUNTED IN VEHICLE

INCORPORATION BY REFERENCE

The disclosure of Japanese Patent Application No. 2017-051181 filed on Mar. 16, 2017 including the specification, drawings and abstract is incorporated herein by reference in its entirety.

BACKGROUND

1. Technical Field

The disclosure relates to an oil supply device for an engine mounted in a vehicle.

2. Description of Related Art

An oil supply device disclosed in Japanese Unexamined Patent Application Publication No. 2016-102423 (JP 2016-102423 A) is provided with an oil pump that has a control oil chamber and an oil control valve that is operated to adjust the internal pressure of the control oil chamber. The oil pump has an input shaft that rotates in synchronization with the rotation of a crankshaft of an engine. An oil discharge amount of the oil pump per rotation of the input shaft changes when the internal pressure of the control oil chamber changes as a result of the operation of the oil control valve.

In general, the oil control valve is provided with a sleeve, a spool disposed inside the sleeve, and an electromagnetic actuator displacing the spool. In the oil control valve described above, the position of the spool inside the sleeve changes and oil supply and discharge with respect to the control oil chamber of the oil pump change when an instruction current value with respect to the actuator changes.

In other words, a supply port to which oil discharged from the oil pump is supplied, a control port communicating with the control oil chamber via a control oil passage, and a discharge port discharging the oil into an oil pan are disposed in the oil control valve. When the oil is supplied to the control oil chamber, communication between the control port and the discharge port is closed and the supply port and the control port communicate with each other by the position of the spool being adjusted based on driving of the actuator. When the oil is discharged from the control oil chamber, communication between the control port and the supply port is closed and the discharge port and the control port communicate with each other by the position of the spool being adjusted based on driving of the actuator.

SUMMARY

The oil in the control oil chamber leaks to the outside of the control oil chamber from the gap between the component parts of the oil pump. Accordingly, the amount of the oil in the control oil chamber decreases once the operation of the oil pump is stopped in synchronization with an operation stop of the engine and no oil is supplied from the oil control valve to the control oil chamber.

It takes time for both the control oil chamber and the control oil passage to be filled with the oil even after the operation of the engine is initiated in the above-described state and the oil is discharged from the oil pump by the crankshaft rotating. In other words, the time needed until control of the oil discharge amount of the oil pump per rotation of the input shaft becomes possible after the initiation of the operation of the engine increases.

An aspect of the disclosure relates to an oil supply device for an engine mounted in a vehicle. The oil supply device includes an oil pump having a control oil chamber and an oil control valve connected to the control oil chamber via a control oil passage. The oil control valve is configured to change a state of supply and discharge of oil with respect to the control oil chamber via the control oil passage in accordance with an instruction current value. The oil pump includes an input shaft configured to rotate in synchronization with rotation of a crankshaft of the engine, and the oil pump is configured such that an oil discharge amount per rotation of the input shaft changes when an internal pressure of the control oil chamber changes. The control oil passage has an oil descent passage and an oil rise passage, a first end of the oil descent passage on the control oil chamber side is disposed at a position closer to a bottom of the vehicle than a second end of the oil descent passage on the oil control valve side, the oil rise passage is disposed at a position closer to the control oil chamber side than the oil descent passage, and a third end of the oil rise passage on the control oil chamber side is disposed at a position closer to a top of the vehicle than a fourth end of the oil rise passage on the oil control valve side.

The section of the control oil passage between the second end of the oil descent passage on the oil control valve side and the third end of the oil rise passage on the control oil chamber side is referred to as a reserving section. According to the aspect of the disclosure, the oil in the reserving section is likely to flow out neither to the oil control valve side nor to the control oil chamber side in a case where no oil is supplied from the oil control valve to the control oil chamber. Accordingly, a certain amount of the oil can be left in the control oil passage even when a state where no oil is supplied to the control oil chamber continues for a long period of time because the operation of the engine is stopped. As a result, in a case where the operation of the engine is initiated in a state where little oil remains in the control oil chamber, the control oil chamber can be filled with the oil early as the oil remains in the control oil passage. Therefore, in a case where the operation of the engine is subsequently initiated, the time needed until control of the oil discharge amount of the oil pump per rotation of the input shaft becomes possible after the initiation of the operation can be shortened.

In the oil supply device according to the aspect of the disclosure, the oil pump may be disposed at a position closer to one side of the engine than a center of the engine in a crank extension direction that is an extension direction of the crankshaft. The oil control valve may be disposed at a position closer to the other side of the engine than the center of the engine in the crank extension direction.

According to the aspect of the disclosure, the oil pump and the oil control valve are disposed apart from each other, and the control oil passage is longer than in a case where both the oil pump and the oil control valve are disposed on one side of the engine in the crank extension direction or both the oil pump and the oil control valve are disposed on the other side of the engine in the crank extension direction. In a case where the reserving section is not disposed in the control oil passage that is long as described above, much time is likely to be needed for the control oil passage to be filled with the oil when the operation of the engine is initiated in a state where little oil remains in the control oil chamber and the control oil passage. According to the aspect of the disclosure, the reserving section is disposed in the control oil passage that is long as described above in this regard. Accordingly, the effect of shortening the time needed until the control oil passage is filled with the oil by the supply of the oil from the oil control valve is greater than in a case where the control oil passage is not long. In other words, the application of the above-described configuration to the long control oil passage is beneficial in that control of the oil discharge amount of the oil pump per rotation of the input shaft is initiated early.

In the oil supply device according to the aspect of the disclosure, the second end of the oil descent passage may be connected to the oil control valve and the third end of the oil rise passage may be disposed at a position closer to the oil pump side than the center of the engine in the crank extension direction.

According to the aspect of the disclosure, both ends of the reserving section can be disposed apart from each other in the crank extension direction, and thus the volume of the reserving section can be larger than in a case where both ends of the reserving section are positioned to be closer to the oil control valve side than the center of the engine in the crank extension direction. In other words, a larger amount of oil can be stored in the control oil passage. Therefore, in a case where the operation of the engine is initiated in a state where little oil remains in the control oil chamber, the control oil chamber can be filled with the oil early as the amount of the oil remaining in the control oil passage is large.

In the oil supply device according to the aspect of the disclosure, the third end of the oil rise passage may be disposed at a position closer to the top of the second end of the oil descent passage.

According to the aspect of the disclosure, a larger amount of oil can be stored in the reserving section than in a case where the third end of the oil rise passage is positioned to be closer to the bottom of the vehicle than the fourth end of the oil rise passage. Therefore, in a case where the operation of the engine is initiated in a state where little oil remains in the control oil chamber, the control oil chamber can be filled with the oil early as the amount of the oil remaining in the control oil passage is large.

In the oil supply device according to the aspect of the disclosure, the oil supply device may further include an electronic control unit configured to control an operation of the oil control valve by controlling the instruction current value. The oil control valve may be configured such that the supply of the oil from the oil control valve to the control oil chamber via the control oil passage is stopped when the instruction current value is a value equal to zero and the oil is supplied from the oil control valve to the control oil chamber via the control oil passage when the instruction current value is a value exceeding zero. In this case, the electronic control unit may be configured to execute oil supply processing to supply the oil from the oil control valve to the control oil chamber via the control oil passage by setting the instruction current value to a value exceeding zero on condition that an operation stop of the engine is requested when the instruction current value is allowed to be the value equal to zero.

Even during the operation of the engine, little oil is likely to remain in the control oil chamber in a case where the instruction current value is equal to zero. In the period from a request for the operation stop of the engine to stopping of the rotation of the crankshaft, the input shaft still rotates, and thus the oil is discharged from the oil pump. According to the aspect of the disclosure, in a case where the operation stop of the engine is requested under a situation in which the instruction current value is equal to zero, the oil discharged from the oil pump can be supplied to the control oil chamber via the oil control valve and the control oil passage by the instruction current value being allowed to exceed zero by the execution of the oil supply processing. Therefore, the amount of the oil remaining in the control oil chamber at a point in time when the rotation of the crankshaft is stopped can be larger than in a case where the oil supply processing is not executed despite a request for the operation stop of the engine. As a result, the operation of the engine is unlikely to be initiated in a state where little oil remains in the control oil chamber.

The oil supply from the oil control valve to the control oil chamber during the execution of the oil supply processing becomes increasingly difficult as the temperature of the oil decreases and the viscosity of the oil increases. Accordingly, in the aspect of the disclosure, the electronic control unit may be configured to lengthen an execution period of the oil supply processing as the temperature of the oil decreases.

In this case, a valve controller executes the oil supply processing for the execution period determined by a period determination unit on condition that the operation stop of the engine is requested under a situation in which the instruction current value is equal to zero. According to the aspect of the disclosure, the period of the oil supply from the oil control valve to the control oil chamber can be lengthened as the temperature of the oil decreases and the viscosity of the oil increases. Therefore, the amount of the oil in the control oil chamber at a time when the execution of the oil supply processing is terminated is unlikely to decrease even when the temperature of the oil is low.

BRIEF DESCRIPTION OF THE DRAWINGS

Features, advantages, and technical and industrial significance of exemplary embodiments will be described below with reference to the accompanying drawings, in which like numerals denote like elements, and wherein.

DETAILED DESCRIPTION OF EMBODIMENTS

Figure 1:
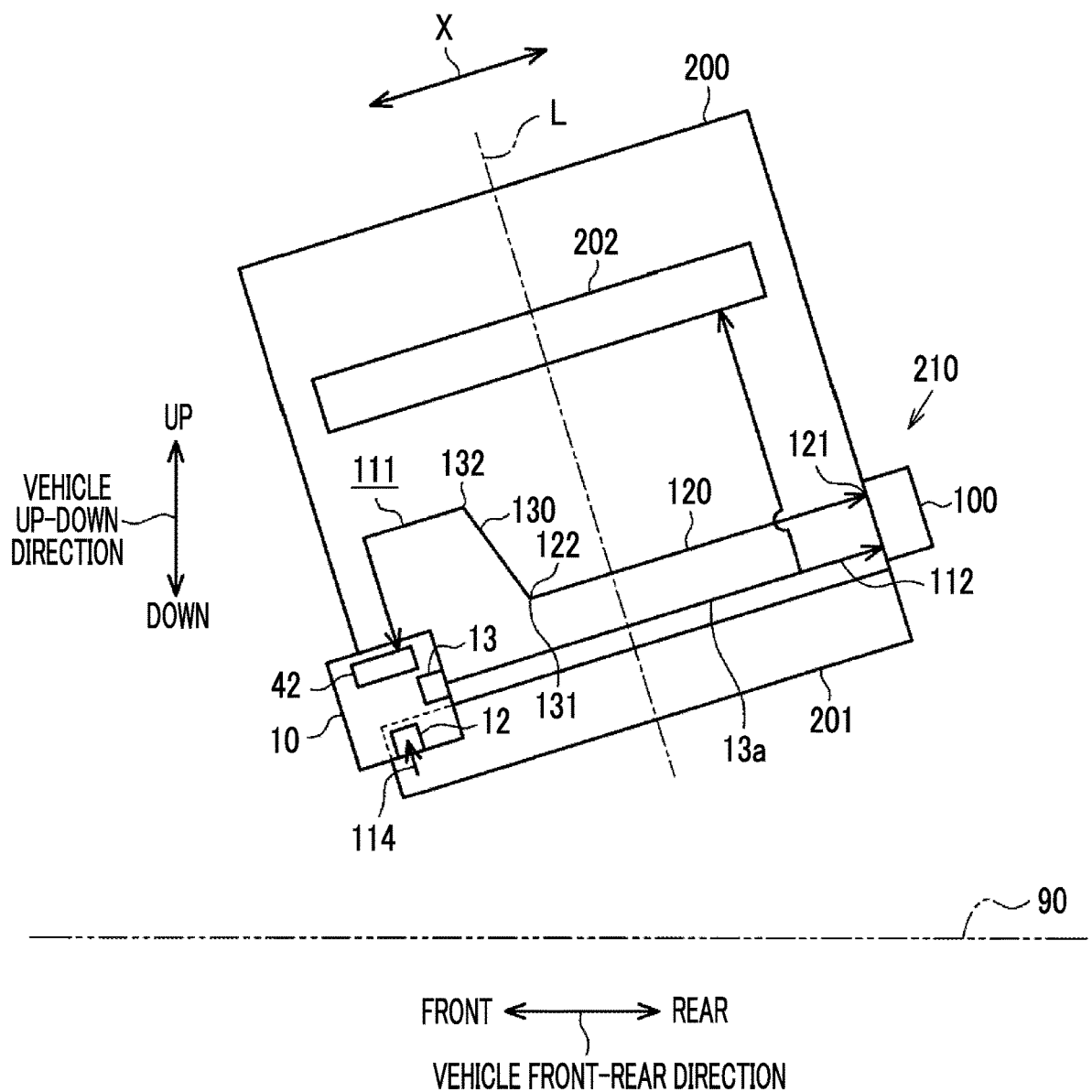
FIG. 1 is a schematic diagram illustrating an internal combustion engine provided with an oil supply device according to an embodiment for an engine mounted in a vehicle.

Hereinafter, an embodiment of an oil supply device for an engine that is mounted in a vehicle will be described with reference to FIGS. 1 to 6. An engine 200 that is provided with an oil supply device 210 according to this embodiment is illustrated in FIG. 1. The two-dot chain line in FIG. 1 is a road surface 90 on which the vehicle in which the engine 200 is mounted travels. The engine 200 mounted in the vehicle is inclined to the rear of the vehicle. The engine 200 is provided with an oil pan 201 storing oil and a main oil gallery 202 to which the oil in the oil pan 201 is supplied by the oil supply device 210 being operated. The main oil gallery 202 is disposed to be closer to the top of the vehicle than an oil pump 10 (described later) and an oil control valve 100 (described later) of the oil supply device 210. The oil is supplied through the main oil gallery 202 to a plurality of devices in the engine 200 that needs the oil supply. The oil discharged from the devices returns to the oil pan 201.

As illustrated in FIG. 1, the oil supply device 210 is provided with the oil pump 10 and the oil control valve 100. The oil pump 10 is disposed on one side (left side in the FIG. 1) with respect to a center L of the engine 200 indicated by the one-dot chain line in FIG. 1 in a crank extension direction X that is the extension direction of a crankshaft of the engine 200. The oil control valve 100 is disposed on the other side (right side in the FIG. 1) with respect to the center L of the engine 200 in the crank extension direction X.

Figure 2:
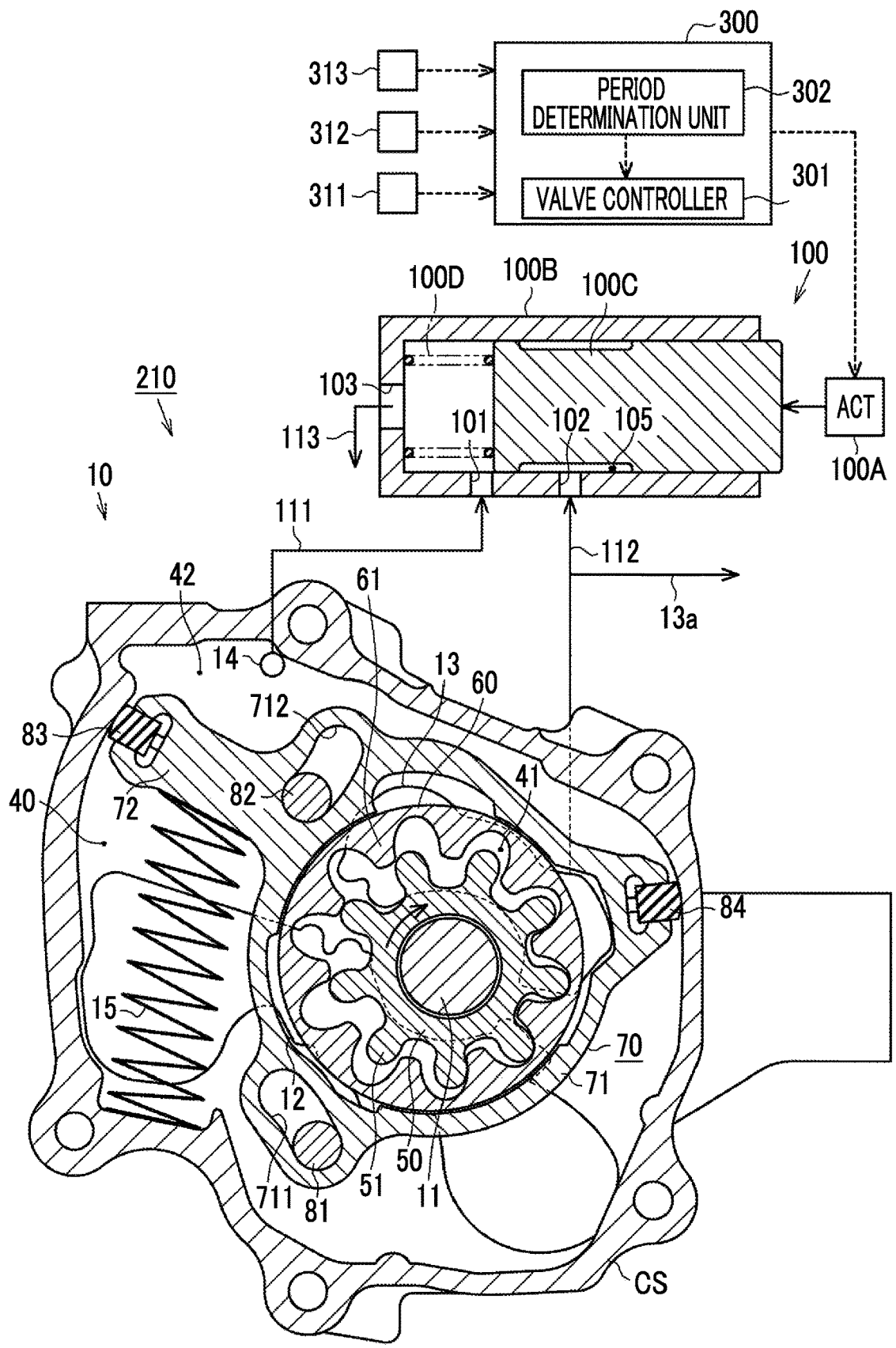
FIG. 2 is a configuration diagram illustrating the oil supply device.
Figure 3:
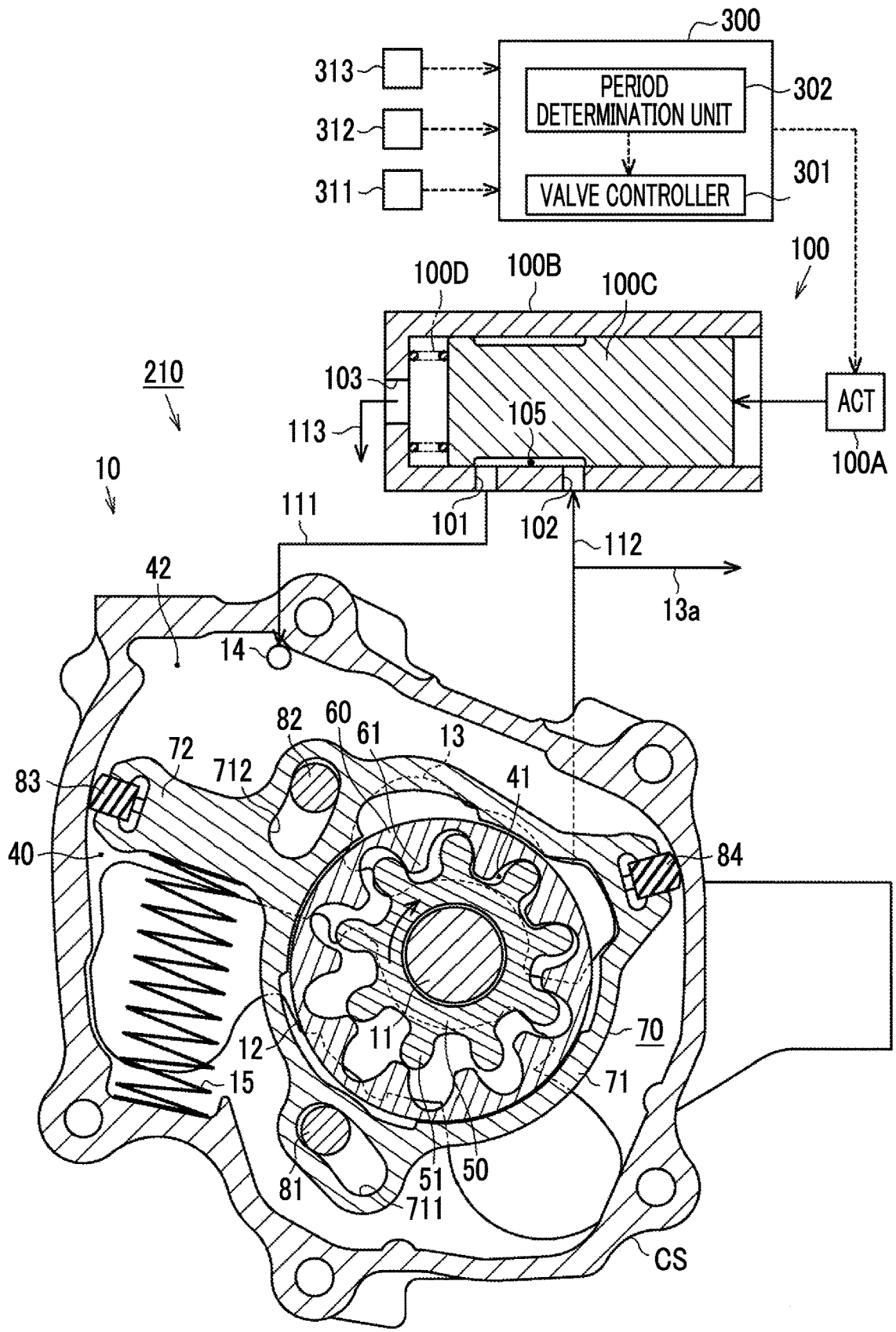
FIG. 3 is a configuration diagram illustrating the oil supply device.

The oil pump 10 will be described with reference to FIGS. 1 to 3. The oil pump 10 is a variable capacity-type pump that is operated based on rotation of the crankshaft of the engine 200. As illustrated in FIGS. 2 and 3, the oil pump 10 is provided with an input shaft 11 synchronously rotating with the crankshaft and a casing member CS in which an accommodating space 40 is partitioned. An inner rotor 50 integrally rotating with the input shaft 11, an outer rotor 60 disposed to be closer to an outer peripheral side than the inner rotor 50, and a ring-shaped adjustment ring 70 surrounding the outer rotor 60 are disposed in the accommodating space 40.

A suction port 12 suctioning the oil into the casing member CS and a discharge port 13 discharging the oil in the casing member CS to the outside of the casing member CS are disposed in the casing member CS. As illustrated in FIG. 1, the suction port 12 communicates with a suction oil passage 114 leading to the oil pan 201 and the discharge port 13 communicates with a discharge oil passage 13a leading to the main oil gallery 202.

As illustrated in FIGS. 2 and 3, a plurality of external teeth 51 is disposed on the outer periphery of the inner rotor 50 and a plurality of internal teeth 61 meshing with the external teeth 51 of the inner rotor 50 is disposed on the inner periphery of the outer rotor 60. The number of the internal teeth 61 is one more than the number of the external teeth 51. The outer rotor 60 is rotatably held by the adjustment ring 70.

The center of rotation of the outer rotor 60 is eccentric with respect to the center of rotation of the inner rotor 50. The external teeth 51 of the inner rotor 50 and the internal teeth 61 of the outer rotor 60 are in a state where parts of the external teeth 51 and the internal teeth 61 (right side parts in FIG. 2) mesh with each other. An operation chamber 41 filled with the oil is formed between the outer periphery of the inner rotor 50 and the inner periphery of the outer rotor 60.

The gap between the external teeth 51 of the inner rotor 50 and the internal teeth 61 of the outer rotor 60 gradually increases, as each of the rotors 50, 60 rotates, at the part of the operation chamber 41 from the position where the external teeth 51 of the inner rotor 50 and the internal teeth 61 of the outer rotor 60 mesh with each other to a predetermined position in the direction of rotation of the input shaft 11 indicated by an arrow in FIG. 2. The part where the gap between the external teeth 51 of the inner rotor 50 and the internal teeth 61 of the outer rotor 60 gradually increases as described above communicates with the suction port 12. The part of the operation chamber 41 where the gap between the external teeth 51 of the inner rotor 50 and the internal teeth 61 of the outer rotor 60 gradually decreases as the rotors 50, 60 rotate communicates with the discharge port 13.

When the oil pump 10 is operated, each of the rotors 50, 60 rotates while the rotors 50, 60 mesh with each other by the input shaft 11 rotating. The oil stored in the oil pan 201 (refer to FIG. 1) is suctioned from the suction port 12 to the operation chamber 41 via the suction oil passage 114 (refer to FIG. 1) and discharged from the discharge port 13 to the discharge oil passage 13a.

The adjustment ring 70 has a ring-shaped body portion 71 holding the outer rotor 60 and a protruding portion 72 protruding in the radial direction of the rotors 50, 60 from the outer periphery of the body portion 71. Long holes 711, 712 extending in a specified direction are disposed in the body portion 71 of the adjustment ring 70. Guide pins 81, 82 fixed to the casing member CS are inserted into the long holes 711, 712. According to the above, the adjustment ring 70 can be displaced in the direction in which the long holes 711, 712 extend.

A first seal member 83 is disposed at the tip of the protruding portion 72 of the adjustment ring 70, and a second seal member 84 is disposed in the body portion 71. Each of the seal members 83, 84 abuts against the side wall of the casing member CS. In the accommodating space 40, a control oil chamber 42 is formed in a partitioned manner by the adjustment ring 70 and each of the seal members 83, 84 by the space between the side wall of the casing member CS and the outer periphery of the adjustment ring 70 being sealed.

An opening portion 14 communicating with a control oil passage 111 is disposed in the control oil chamber 42, and the oil can be supplied from the oil control valve 100 to the control oil chamber 42 through the control oil passage 111 and the opening portion 14. A spring 15 is disposed in the accommodating space 40, and the spring 15 gives the protruding portion 72 biasing force in the direction to decrease the volume of the control oil chamber 42. The spring 15 is arranged on the side opposite to the control oil chamber 42 across the protruding portion 72. FIG. 2 shows a state where the adjustment ring 70 is held at the position where the volume of the control oil chamber 42 is minimized by the biasing force from the spring 15 because the internal pressure of the control oil chamber 42 is low. In this embodiment, the position of the adjustment ring 70 at a time when the volume of the control oil chamber 42 is minimized as described above, that is, the position of the adjustment ring 70 in FIG. 2 will be referred to as an "initial position".

Once the oil is supplied to the control oil chamber 42 and the internal pressure of the control oil chamber 42 increases under a situation in which the adjustment ring 70 is disposed at the initial position, the adjustment ring 70 is displaced from the initial position against the biasing force from the spring 15 and in the direction to increase the volume of the control oil chamber 42. In other words, the adjustment ring 70 is displaced while the adjustment ring 70 rotates in the direction from the state illustrated in FIG. 2 toward the state illustrated in FIG. 3 (counterclockwise direction in FIG. 2). Once the oil is discharged from the control oil chamber 42 by the oil control valve 100 being operated, the internal pressure of the control oil chamber 42 decreases and the adjustment ring 70 is displaced in the direction to decrease the volume of the control oil chamber 42 by the biasing force from the spring 15. In other words, the adjustment ring 70 is displaced while the adjustment ring 70 rotates in the direction from the state illustrated in FIG. 3 toward the state illustrated in FIG. 2 (clockwise direction in FIG. 3). In other words, the position of the adjustment ring 70 is determined by the internal pressure of the control oil chamber 42 and the biasing force from the spring 15. The relative positions of the parts where the teeth 51, 61 of the inner rotor 50 and the outer rotor 60 mesh with each other with respect to the respective openings of the suction port 12 and the discharge port 13 vary with the position of the adjustment ring 70. Accordingly, an oil discharge amount per rotation of the input shaft 11 is changed through a change in the position of the adjustment ring 70 resulting from adjustment of the internal pressure of the control oil chamber 42.

Specifically, in the oil pump 10, the oil discharge amount per rotation of the input shaft 11 is maximized when the position of the adjustment ring 70 is at the "initial position" as illustrated in FIG. 2. Once the internal pressure of the control oil chamber 42 increases from a state where the oil pump 10 is at the position where the oil discharge amount per rotation of the input shaft 11 is maximized as illustrated in FIG. 2, the adjustment ring 70 is displaced while the adjustment ring 70 rotates in the counterclockwise direction in FIG. 2 against the biasing force from the spring 15 as the internal pressure of the control oil chamber 42 rises. As a result, a part of the part where the range overlapping the suction port 12 decreases and the gap between the external teeth 51 and the internal teeth 61 gradually decreases that is a part of the part where the gap between the external teeth 51 and the internal teeth 61 gradually increases as the rotors 50, 60 rotate overlaps the suction port 12. As a result, the oil discharge amount per rotation of the input shaft 11 decreases. When the internal pressure of the control oil chamber 42 decreases, in contrast, the adjustment ring 70 is displaced while the adjustment ring 70 rotates in the clockwise direction in FIG. 3 by the biasing force from the spring 15 as the internal pressure of the control oil chamber 42 decreases, and the oil discharge amount per rotation of the input shaft 11 increases.

The oil control valve 100 will be described with reference to FIGS. 1 to 3. As illustrated in FIGS. 2 and 3, the oil control valve 100 is provided with a sleeve 100B, a spool 100C disposed inside the sleeve 100B, a valve spring 100D disposed inside the sleeve 100B, and an electromagnetically driven actuator 100A. The valve spring 100D gives the spool 100C a biasing force to one side in the axial direction of the sleeve 100B (right side in FIGS. 2 and 3). The actuator 100A is for driving to give the spool 100C a drive force for displacing the spool 100C to the other side in the axial direction (left side in FIGS. 2 and 3) against the biasing force from the valve spring 100D. The drive force transmitted to the spool 100C as described above increases as an instruction current value Iocv input to the actuator 100A increases. Accordingly, the spool 100C is positioned to become closer to the other side in the axial direction (left side in FIGS. 2 and 3) as the instruction current value Iocv input to the actuator 100A increases.

A control port 101 to which the control oil passage 111 is connected, a supply port 102 to which a supply oil passage 112 branching from the discharge oil passage 13a of the oil pump 10 is connected, and a discharge port 103 to which a discharge oil passage 113 for discharging the oil into the oil pan 201 is connected are disposed in the sleeve 100B. An annular groove 105 communicating with the supply port 102 is formed over the entire circumference in the outer peripheral surface of the spool 100C. In a case where no instruction current value Iocv is input to the actuator 100A, the tip of the spool 100C (left end in FIG. 2) is positioned to be closer to the one side in the axial direction (right side in FIG. 2) than the control port 101 and the control port 101 communicates with the discharge port 103 as illustrated in FIG. 2. According to the above, the oil flowing back from the control oil chamber 42 of the oil pump 10 to the control port 101 is discharged to the oil pan 201 via the discharge port 103, and thus the internal pressure of the control oil chamber 42 decreases. As a result, the adjustment ring 70 is positioned at the initial position illustrated in FIG. 2 and the oil discharge amount of the oil pump 10 per rotation of the input shaft 11 becomes the largest discharge amount that can be realized at that point in time.

Once the instruction current value Iocv input to the actuator 100A increases, the spool 100C is displaced from the position illustrated in FIG. 2 to the other side in the axial direction (left side in FIGS. 2 and 3). Once the control port 101 is closed by the part of the spool 100C that is closer to the tip side (left side in FIGS. 2 and 3) than the annular groove 105, the communication between the control port 101 and the discharge port 103 is released. According to the above, the oil in the control oil chamber 42 of the oil pump 10 does not return to the oil pan 201 via the discharge port 103.

Once the instruction current value Iocv further increases, the control port 101 and the inside of the annular groove 105 communicate with each other. The annular groove 105 communicates with the supply port 102, and thus the control port 101 communicates with the supply port 102 via the annular groove 105 as illustrated in FIG. 3. As a result, the oil flowing into the sleeve 100B via the supply port 102 is supplied to the control oil chamber 42 via the control port 101. The flow path cross-sectional area of the part where the control port 101 and the annular groove 105 communicate with each other gradually increases as the instruction current value Iocv increases in this state. Accordingly, the amount of the oil that can be supplied to the control oil chamber 42 via the control port 101 increases as the instruction current value Iocv increases.

In a case where the spool 100C is disposed at the position that is illustrated in FIG. 2, the discharge port 103 and the control port 101 communicate with each other and communication between the control port 101 and the supply port 102 is closed. Accordingly, no oil is supplied from the oil control valve 100 to the control oil chamber 42 of the oil pump 10 via the control oil passage 111. Therefore, the position of the spool 100C in FIG. 2 corresponds to a "first position" at which no oil is supplied to the control oil chamber 42. In a case where the spool 100C is disposed at the position that is illustrated in FIG. 3, communication between the discharge port 103 and the control port 101 is closed and the control port 101 and the supply port 102 communicate with each other. Accordingly, the oil is supplied from the oil control valve 100 to the control oil chamber 42 via the control oil passage 111. Therefore, the position of the spool 100C in FIG. 3 corresponds to a "second position" at which the oil is supplied to the control oil chamber 42.

The oil in the control oil chamber 42 of the oil pump 10 leaks to the outside of the control oil chamber 42 from the gap between the component parts of the oil pump 10. Accordingly, the oil needs to be continuously supplied from the oil control valve 100 to the control oil chamber 42 for the internal pressure of the control oil chamber 42 not to decrease. As the amount of the oil supplied to the control oil chamber 42 via the control port 101 increases, the amount of the oil supplied to the control oil chamber 42 and the amount of the oil leaking from the control oil chamber 42 become closer to an equilibrium state in a state where the internal pressure of the control oil chamber 42 is high. Therefore, in this embodiment, the adjustment ring 70 is displaced in the direction to increase the volume of the control oil chamber 42 and the oil discharge amount of the oil pump 10 per rotation of the input shaft 11 gradually decreases as the instruction current value Iocv increases.

Figure 4:
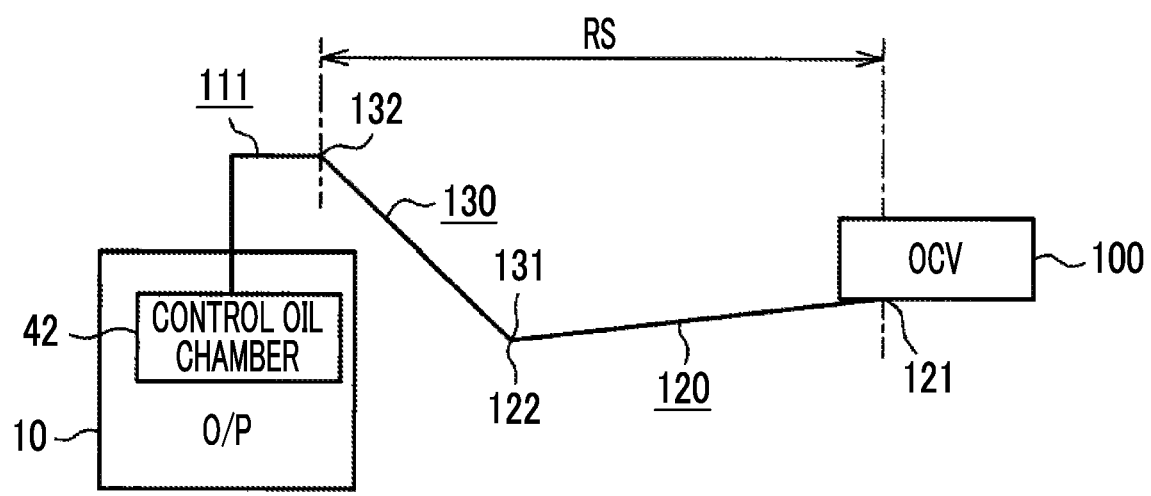
FIG. 4 is a schematic diagram illustrating a schematic configuration of a control oil passage of the oil supply device.

The control oil passage 111 will be described with reference to FIGS. 1 and 4. As illustrated in FIGS. 1 and 4, the control oil passage 111 is an oil passage connecting the control port 101 of the oil control valve 100 and the control oil chamber 42 of the oil pump 10 to each other. The control oil passage 111 has an oil descent passage 120 connected to the control port 101 and an oil rise passage 130 positioned to be closer to the control oil chamber 42 side than the oil descent passage 120 in the crank extension direction X. The oil descent passage 120 is inclined with respect to the road surface 90 such that an end 122 on the control oil chamber 42 side (left end in FIG. 4 and an example of a first end) is positioned to be closer to the bottom of the vehicle than an end 121 on the oil control valve 100 side (right end in FIG. 4 and an example of a second end). The end 121 of the oil descent passage 120 on the oil control valve 100 side is positioned to be closer to one side (right side in the FIG. 1) than the center L of the engine 200 in the crank extension direction X.

An end 131 of the oil rise passage 130 on the oil control valve 100 side (right end in FIG. 4 and an example of a fourth end) is connected to the end 122 of the oil descent passage 120 on the control oil chamber 42 side. An end 132 of the oil rise passage 130 on the control oil chamber 42 side (left end in FIG. 4 and an example of a third end) is positioned to be closer to the other side (left side in the FIG. 1) than the center L of the engine 200 in the crank extension direction X. The oil rise passage 130 is inclined with respect to the road surface 90 such that the end 132 on the control oil chamber 42 side is positioned to be closer to the top of the vehicle than the end 131 on the oil control valve 100 side. In addition, the end 132 of the oil rise passage 130 on the control oil chamber 42 side is positioned to be closer to the top of the vehicle than the end 121 of the oil descent passage 120 on the oil control valve 100 side. In this embodiment, the section of the control oil passage 111 from the end 121 of the oil descent passage 120 on the oil control valve 100 side to the end 132 of the oil rise passage 130 on the control oil chamber 42 side will be referred to as a "reserving section RS".

An electronic control unit 300 for the oil supply device 210 will be described with reference to FIG. 2. As illustrated in FIG. 2, an oil pressure sensor 311, a temperature sensor 312, and a crank angle sensor 313 are electrically connected to the electronic control unit 300. The oil pressure sensor 311 detects an oil pressure PS that is the pressure of the oil in the main oil gallery 202, and the temperature sensor 312 detects an oil temperature TMP that is the temperature of the oil supplied to the oil pump 10. The crank angle sensor 313 detects an engine rotation speed NE that is the rotation speed of the crankshaft. The electronic control unit 300 controls the operation of the oil pump 10 by controlling the instruction current value Iocv with respect to the actuator 100A of the oil control valve 100 based on the information detected by each of the sensors 311 to 313 described above.

The electronic control unit 300 has a valve controller 301 and a period determination unit 302 as functional units for controlling the operation of the oil control valve 100. The valve controller 301 controls the operation of the oil control valve 100, that is, the instruction current value Iocv with respect to the actuator 100A. In other words, the valve controller 301 calculates the instruction current value Iocv based on a target oil pressure and the oil pressure PS detected by the oil pressure sensor 311. For example, the valve controller 301 decreases the instruction current value Iocv when the oil pressure PS is lower than the target oil pressure. According to the above, the amount of the oil supplied from the oil control valve 100 to the control oil chamber 42 of the oil pump 10 decreases and the internal pressure of the control oil chamber 42 decreases. As a result, the oil discharge amount of the oil pump 10 per rotation of the input shaft 11 increases and the oil pressure PS increases.

Sometimes, the valve controller 301 executes full discharge control to discharge the oil from the oil pump 10 in a state where the instruction current value Iocv with respect to the actuator 100A of the oil control valve 100 is equal to zero. For example, the valve controller 301 may execute the full discharge control when the valve controller 301 determines that there is a possibility that an abnormality has occurred in the oil pump 10 or the oil control valve 100.

The period determination unit 302 allows a prescribed period TMTh to be a length in accordance with the oil temperature TMP detected by the temperature sensor 312. The prescribed period TMTh is the execution period of oil supply processing executed by the valve controller 301. Specifically, the period determination unit 302 lengthens the prescribed period TMTh as the oil temperature TMP decreases. The oil supply processing will be described later.

One of the processing routines that are executed by the valve controller 301 will be described with reference to FIG. 5. The processing routine is executed so that the operation of the oil control valve 100 at a time when an operation stop of the engine 200 is requested is controlled.

Figure 5:
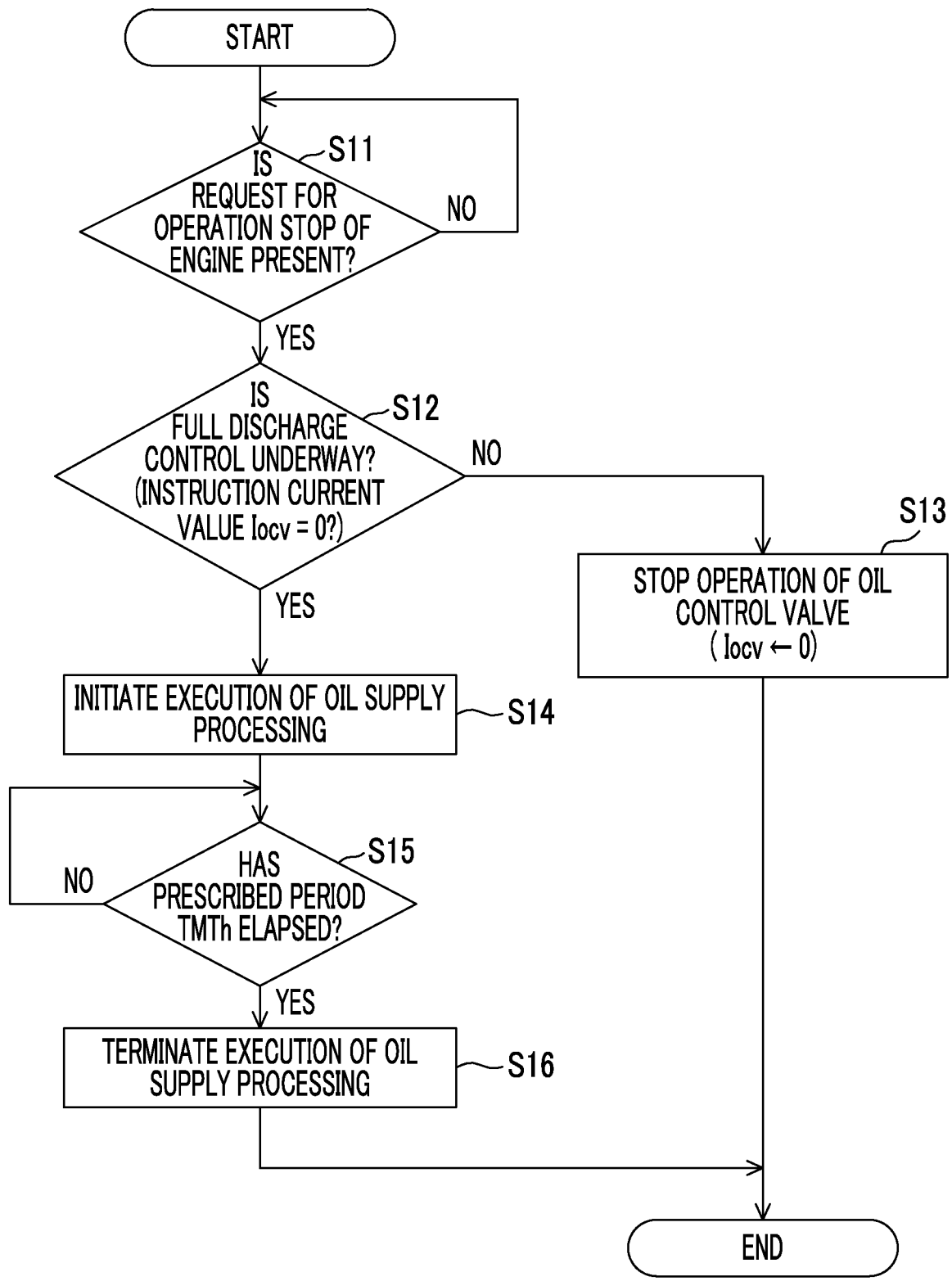
FIG. 5 is a flowchart showing a processing routine executed by a valve controller of the oil supply device.

As illustrated in FIG. 5, the valve controller 301 determines whether or not the operation stop of the engine is requested (Step S11). The operation stop request includes both a request for an automatic stop of the engine 200 in a hybrid vehicle or the like and a request for an operation stop based on an OFF operation of an ignition switch. In a case where the operation stop is not requested (Step S11: NO), the valve controller 301 repeats the determination processing of Step S11. In a case where the operation stop is requested (Step S11: YES), the valve controller 301 determines whether or not the execution of the full discharge control is underway (Step S12). In a case where the execution of the full discharge control is underway, the valve controller 301 is capable of determining that there is a possibility that little oil remains in the control oil chamber 42 of the oil pump 10 because the instruction current value Iocv is equal to zero. In a case where the full discharge control is not executed, the valve controller 301 is capable of determining that both the control oil chamber 42 and the control oil passage 111 are filled with the oil because the oil is supplied from the oil control valve 100 to the control oil chamber 42.

Accordingly, in a case where the full discharge control is not executed (Step S12: NO), the valve controller 301 stops the operation of the oil control valve 100 by causing the instruction current value Iocv to be equal to zero (Step S13). Then, the valve controller 301 terminates this processing routine.

In a case where the execution of the full discharge control is underway (Step S12: YES), the valve controller 301 sets the instruction current value Iocv to a large value and initiates the execution of the oil supply processing to displace the spool 100C of the oil control valve 100 up to the second position (Step S14). In other words, the oil supply processing is processing to supply the oil from the oil control valve 100 to the control oil chamber 42 via the control oil passage 111 by causing the instruction current value Iocv to exceed zero. The valve controller 301 determines whether or not the prescribed period TMTh determined by the period determination unit 302 has elapsed (Step S15). In a case where the prescribed period TMTh has not elapsed yet (Step S15: NO), the valve controller 301 repeats the determination processing of Step S15. In a case where the prescribed period TMTh has already elapsed (Step S15: YES), the valve controller 301 terminates the execution of the oil supply processing (Step S16). As a result of the above, the instruction current value Iocv becomes equal to zero. Then, the valve controller 301 terminates this processing routine.

Figure 6:
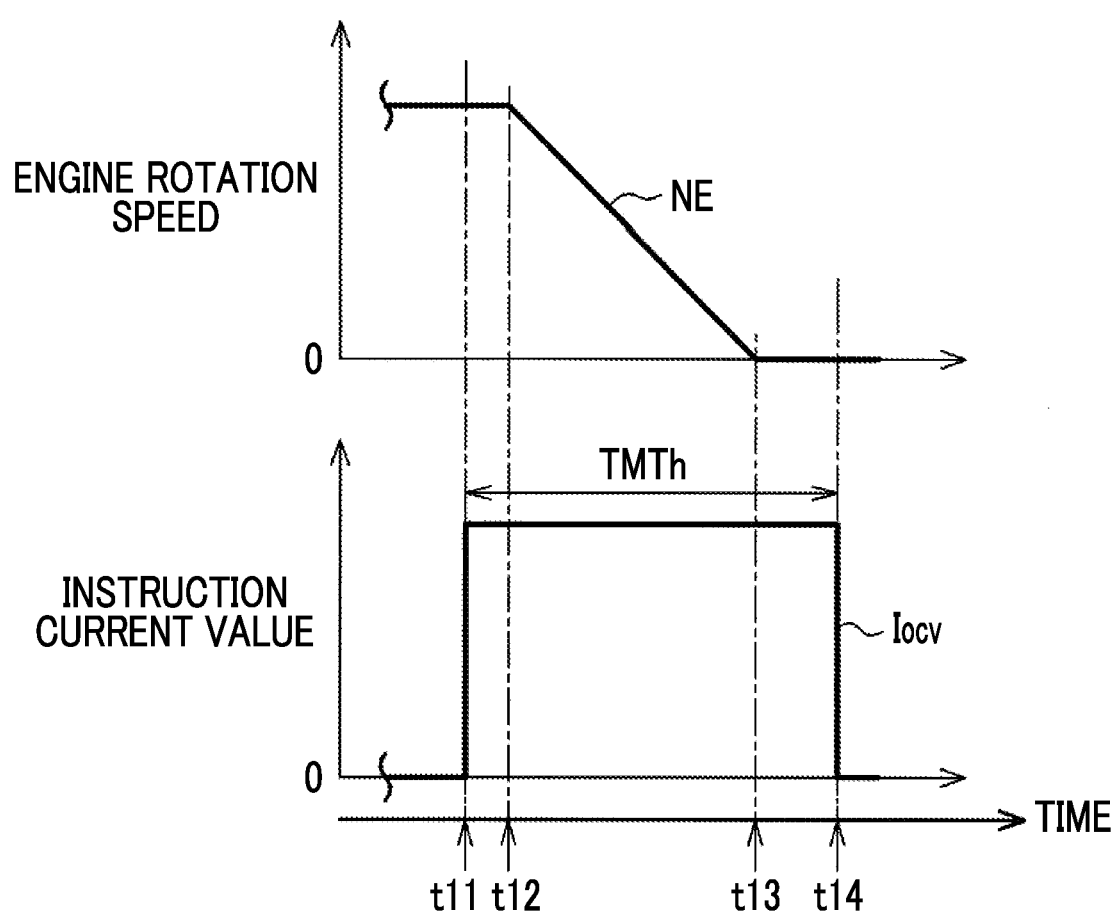
FIG. 6 is a timing chart in a case where oil supply processing is executed when an operation of the engine is stopped.

The action and effect at a time when the operation stop of the engine 200 is requested in the middle of the execution of the full discharge control will be described with reference to FIG. 6. As illustrated in FIG. 6, the execution of the oil supply processing is initiated once the operation stop of the engine 200 is requested at a first timing t11 when the full discharge control is executed. As a result of the above, the instruction current value Iocv with respect to the actuator 100A of the oil control valve 100 increases from zero. According to the above, in the oil control valve 100, the spool 100C moves from the first position illustrated in FIG. 2 to the second position illustrated in FIG. 3 and oil supply to the control oil chamber 42 of the oil pump 10 via the control port 101 and the control oil passage 111 is initiated.

In the example that is illustrated in FIG. 6, the operation of the engine 200 is stopped between a second timing t12 and a third timing t13. In this example, the oil supply processing is executed until a fourth timing t14 following the third timing t13.

In the period from the first timing t11 to the third timing t13, the crankshaft of the engine 200 still rotates, and thus the oil is still discharged from the oil pump 10. Accordingly, in that period, some of the oil discharged from the discharge port 13 of the oil pump 10 can be supplied to the control oil chamber 42 via the oil control valve 100 and the control oil passage 111. Therefore, although little oil remains in the control oil chamber 42 at the point in time when the operation stop of the engine 200 is requested, the oil discharged from the oil pump 10 can be supplied to the control oil chamber 42 by the execution of the oil supply processing being triggered by the operation stop request. In other words, the amount of the oil remaining in the control oil chamber 42 at the point in time when the engine 200 is stopped can be larger than in a case where the oil supply processing is not executed. Therefore, the amount of the oil remaining in the control oil chamber 42 when the operation of the engine 200 is subsequently initiated can be larger than in a case where the oil supply processing is not executed despite an operation stop request. As a result, the time needed until control of the oil discharge amount of the oil pump 10 per rotation of the input shaft 11 becomes possible after the initiation of the operation of the engine 200 can be shortened.

In this embodiment, the execution of the oil supply processing continues even after the crankshaft stops rotating as illustrated in FIG. 6. In other words, in the period from the third timing t13 to the fourth timing t14, the spool 100C is disposed at the second position in the oil control valve 100 even in a state where no oil is discharged from the oil pump 10.

As illustrated in FIG. 1, the main oil gallery 202 is disposed to be closer to the top of the vehicle than the oil control valve 100 and the oil pump 10. Accordingly, once oil discharge from the oil pump 10 is stopped, the oil in the main oil gallery 202 flows back to the oil pump 10 side through the discharge oil passage 13a. As a result, some of the oil flowing back through the discharge oil passage 13a as described above flows into the supply port 102 of the oil control valve 100 through the supply oil passage 112. In other words, the oil flowing back through the discharge oil passage 13a and flowing into the supply port 102 is supplied to the control oil chamber 42 via the control port 101 and the control oil passage 111. Therefore, the amount of the oil supplied to the control oil chamber 42 after the operation stop of the engine 200 is requested can be increased compared to a case where termination of the execution of the oil supply processing is triggered by the crankshaft stopping rotating. Therefore, the amount of the oil remaining in the control oil chamber 42 when the operation of the engine 200 is subsequently initiated can be further increased.

The amount of the oil that can be supplied to the control oil chamber 42 by the oil supply processing being executed is likely to decrease as the oil temperature TMP decreases and the viscosity of the oil increases. Accordingly, in this embodiment, the execution period of the oil supply processing is lengthened as the oil temperature TMP decreases. Therefore, the amount of the oil in the control oil chamber 42 at a time when the execution of the oil supply processing is terminated is unlikely to decrease even when the oil temperature TMP is low.

In a case where the operation stop of the engine 200 is requested under a situation in which the full discharge control is not executed, the oil supply processing is not executed because the oil is supplied from the oil control valve 100 to the control oil chamber 42 and the control oil chamber 42 is filled with the oil. Accordingly, an increase in the frequency of the execution of the oil supply processing can be suppressed and an increase in electric power consumption by the oil control valve 100 can be suppressed to the same extent.

The reserving section RS illustrated in FIG. 4 is disposed in the control oil passage 111 connecting the control port 101 and the control oil chamber 42 to each other. The reserving section RS is configured to be provided with both the oil descent passage 120 and the oil rise passage 130. Accordingly, when the spool 100C is disposed at the first position in the oil control valve 100, the oil in the reserving section RS is likely to flow out neither to the control port 101 side nor to the control oil chamber 42 side. As a result, a certain amount of the oil can be left in the control oil passage 111 even when a state where the spool 100C of the oil control valve 100 is disposed at the first position, that is, a state where no oil is supplied from the oil control valve 100 to the control oil chamber 42 continues for a long period of time by the operation of the engine 200 being stopped. As a result, in a case where the operation of the engine 200 is initiated in a state where little oil remains in the control oil chamber 42, the control oil chamber 42 can be filled with the oil early as the oil remains in the control oil passage 111. Therefore, in a case where initiation of the operation of the engine 200 is subsequently requested, the time needed until control of the oil discharge amount of the oil pump 10 per rotation of the input shaft becomes possible after the initiation of the operation can be shortened.

In this embodiment, the end 132 of the oil rise passage 130 on the control oil chamber 42 side is disposed to be closer to the top of the vehicle than the end 121 of the oil descent passage 120 on the oil control valve 100 side. Accordingly, a larger amount of oil can be stored in the reserving section RS than in a case where the end 132 of the oil rise passage 130 on the control oil chamber 42 side is positioned to be closer to the bottom of the vehicle than the end 121 of the oil descent passage 120 on the oil control valve 100 side. Therefore, in a case where the operation of the engine 200 is initiated in a state where little oil remains in the control oil chamber 42, the control oil chamber 42 can be filled with the oil early as the amount of the oil remaining in the control oil passage 111 is large.

In this embodiment, a first end of the reserving section RS as one of both ends of the reserving section RS is connected to the oil control valve 100 positioned to be closer to the one side than the center L of the engine 200 in the crank extension direction X. A second end of the reserving section RS as the other one of both ends of the reserving section RS is positioned to be closer to the other side than the center L in the crank extension direction X. Accordingly, the volume of the reserving section RS can be larger than in a case where both ends of the reserving section RS are positioned to be closer to the one side than the center L in the crank extension direction X. According to the above, a larger amount of oil can be stored in the control oil passage 111 even when no oil is supplied from the oil control valve 100 to the control oil chamber 42 via the control oil passage 111. Therefore, in a case where the operation of the engine 200 is initiated in a state where little oil remains in the control oil chamber 42, the control oil chamber 42 can be filled with the oil early as the amount of the oil remaining in the control oil passage 111 is large.

The embodiment may be changed into another embodiment as follows. The prescribed period TMTh that is the execution period of the oil supply processing may be fixed at a predetermined value set in advance, regardless of the oil temperature TMP, insofar as the control oil chamber 42 and the control oil passage 111 can be filled with the oil by the oil supply processing being executed.

In the embodiment described above, the execution of the oil supply processing continues even after the crankshaft stops rotating. However, the execution of the oil supply processing may also be terminated when the crankshaft stops rotating insofar as the control oil chamber 42 and the control oil passage 111 can be filled with the oil by the oil supply processing being executed. The execution of the oil supply processing may also be terminated before the crankshaft stops rotating.

The oil supply processing may also be executed after the rotation of the crankshaft is stopped by a request for stopping the operation of the engine 200. In this case, some of the oil flowing back from the main oil gallery 202 through the discharge oil passage 13a flows into the oil control valve 100 via the supply port 102 and the oil is supplied to the control oil chamber 42 via the control port 101 and the control oil passage 111 during the execution of the oil supply processing. Accordingly, the control oil chamber 42 can be filled with the oil by the oil supply processing being executed.

The reserving section RS is disposed in the control oil passage 111, and thus a state where little oil remains in the control oil passage 111 during the operation stop of the engine 200 is unlikely to arise. Accordingly, the oil supply processing may not be executed when the operation of the engine 200 is stopped. Even when no oil supply processing is executed as described above, a certain amount of the oil is left in the control oil passage 111 in a case where the operation of the engine 200 is initiated in a state where little oil remains in the control oil chamber 42, and thus the time needed until control of the oil discharge amount of the oil pump 10 per rotation of the input shaft 11 becomes possible after the initiation of the operation can be shortened.

The oil supply device 210 may also be configured such that both the oil pump 10 and the oil control valve 100 are disposed to be closer to the one side than the center L of the engine 200 in the crank extension direction X.

The reserving section RS of the control oil passage 111 may also be configured such that the end 132 of the oil rise passage 130 on the control oil chamber 42 side is disposed at the same position as the end 121 of the oil descent passage 120 on the oil control valve 100 side in the up-down direction of the vehicle.

The reserving section RS may also be configured such that the end 132 of the oil rise passage 130 on the control oil chamber 42 side is positioned to be closer to the bottom of the vehicle than the end 121 of the oil descent passage 120 on the oil control valve 100 side. In this case, a state where little oil remains in the control oil passage 111 does not arise although the amount of the oil that can be stored in the control oil passage 111 when no oil is supplied from the oil control valve 100 to the control oil chamber 42 is smaller than in a case where the reserving section RS according to the embodiment is disposed in the control oil passage 111.

The end 132 of the oil rise passage 130 on the control oil chamber 42 side may be positioned to be closer to the bottom of the vehicle than the end 121 of the oil descent passage 120 on the oil control valve 100 side. Even in this case, the control oil chamber 42 can be filled with the oil early when the operation of the engine 200 is initiated as the amount of the oil that can be stored in the control oil passage 111 can be larger than in a case where the reserving section RS is not disposed in the control oil passage 111.

Figure 7:
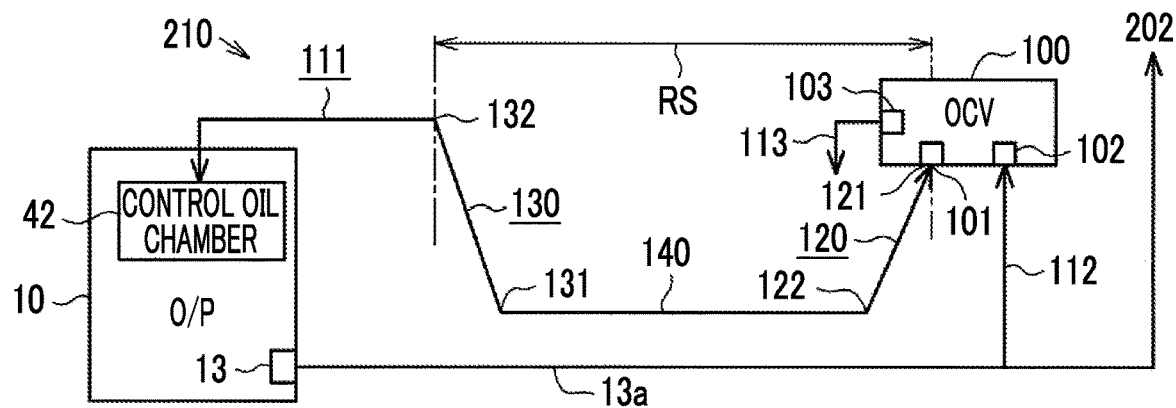
FIG. 7 is a schematic diagram illustrating an oil supply device according to another embodiment for an engine mounted in a vehicle.

Any configuration other than the configuration described in the embodiment above may be adopted for the control oil passage 111 insofar as the control oil passage 111 is capable of storing oil even during the operation stop of the engine 200. For example, the reserving section RS of the control oil passage 111 may be configured such that a horizontal portion 140 parallel to the road surface 90 on which the vehicle travels is disposed between the oil descent passage 120 and the oil rise passage 130 as illustrated in FIG. 7.

Figure 8:
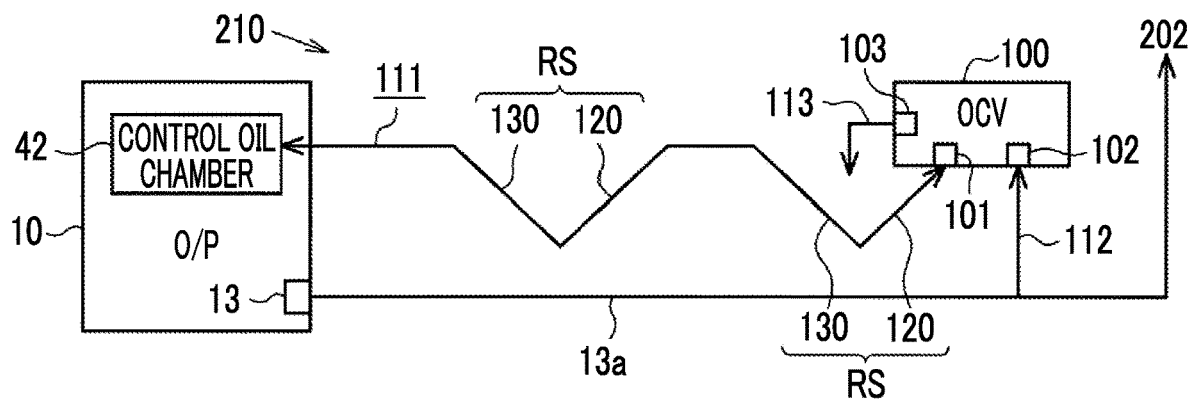
FIG. 8 is a schematic diagram illustrating an oil supply device according to another embodiment for an engine mounted in a vehicle.

The control oil passage 111 may also be configured such that a plurality of the reserving sections RS is disposed in series as illustrated in FIG. 8.

What is claimed is:

1. An oil supply device for an engine mounted in a vehicle, the oil supply device comprising:
   an oil pump having a control oil chamber; and
   an oil control valve connected to the control oil chamber via a control oil passage, the oil control valve being configured to change a state of supply and discharge of oil with respect to the control oil chamber via the control oil passage in accordance with an instruction current value, wherein
   the oil pump includes an input shaft configured to rotate in synchronization with rotation of a crankshaft of the engine,
   the oil pump is configured such that an oil discharge amount per rotation of the input shaft changes when an internal pressure of the control oil chamber changes,
   the control oil passage has an oil descent passage and an oil rise passage, a first end of the oil descent passage on a control oil chamber side is disposed at a position closer to a bottom of the vehicle than a second end of the oil descent passage on an oil control valve side, the oil rise passage is disposed at a position closer to the control oil chamber side than the oil descent passage, and a third end of the oil rise passage on the control oil chamber side is disposed at a position closer to a top of the vehicle than a fourth end of the oil rise passage on the oil control valve side.

2. The oil supply device according to claim 1, wherein the oil pump is disposed at a position closer to one side of the engine than a center of the engine in a crank extension direction, the crank extension direction is an extension direction of the crankshaft, and the oil control valve is disposed at a position closer to the other side of the engine than the center of the engine in the crank extension direction.

3. The oil supply device according to claim 2, wherein the second end of the oil descent passage is connected to the oil control valve, and the third end of the oil rise passage is disposed at a position closer to an oil pump side than the center of the engine in the crank extension direction.

4. The oil supply device according to claim 1, wherein the third end of the oil rise passage is disposed at the position closer to the top of the vehicle than the second end of the oil descent passage.

5. The oil supply device according to claim 1, further comprising an electronic control unit configured to control an operation of the oil control valve by controlling the instruction current value, wherein the oil control valve is configured such that the supply of the oil from the oil control valve to the control oil chamber via the control oil passage is stopped when the instruction current value is a value equal to zero and the oil is supplied from the oil control valve to the control oil chamber via the control oil passage when the instruction current value is a value exceeding zero, and the electronic control unit is configured to execute oil supply processing to supply the oil from the oil control valve to the control oil chamber via the control oil passage by setting the instruction current value to a value exceeding zero on condition that an operation stop of the engine is requested when the instruction current value is allowed to be the value equal to zero.

6. The oil supply device according to claim 5, wherein the electronic control unit is configured to lengthen an execution period of the oil supply processing as a temperature of the oil decreases.

* * * * *